US012617908B2

(12) United States Patent
Otomo et al.

(10) Patent No.: US 12,617,908 B2
(45) Date of Patent: May 5, 2026

(54) LIQUID CRYSTAL POLYMER FILM, LAMINATED BODY INCLUDING THE LIQUID CRYSTAL POLYMER FILM, AND METHOD OF PRODUCING LIQUID CRYSTAL POLYMER FILM

(71) Applicant: Murata Manufacturing Co., Ltd., Nagaokakyo (JP)

(72) Inventors: Shunsuke Otomo, Nagaokakyo (JP); Hiroyuki Masaki, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 18/623,431

(22) Filed: Apr. 1, 2024

(65) Prior Publication Data

US 2024/0247116 A1      Jul. 25, 2024

Related U.S. Application Data

(63) Continuation of application No. PCT/JP2023/022058, filed on Jun. 14, 2023.

(30) Foreign Application Priority Data

Aug. 3, 2022    (JP) ................................. 2022-123967

(51) Int. Cl.
| | |
|---|---|
| *G02F 1/1333* | (2006.01) |
| *C08J 5/18* | (2006.01) |
| *C09K 19/38* | (2006.01) |
| *C09K 19/52* | (2006.01) |
| *C09K 19/54* | (2006.01) |

(52) U.S. Cl.
CPC .............. *C08J 5/18* (2013.01); *C09K 19/3809* (2013.01); *C09K 19/52* (2013.01); *C09K 19/544* (2013.01); *C08J 2367/02* (2013.01); *C09K 2019/521* (2013.01)

(58) Field of Classification Search
CPC .... C09K 19/38; C09K 19/3809; C09K 19/52; C09K 19/544; G02F 1/1333
See application file for complete search history.

(56) References Cited

U.S. PATENT DOCUMENTS

| | | | |
|---|---|---|---|
| 11,412,621 B2 | 8/2022 | Morita et al. | |
| 2020/0315034 A1 | 10/2020 | Morita et al. | |
| 2023/0002548 A1 | 1/2023 | Ohata et al. | |
| 2024/0247116 A1* | 7/2024 | Otomo ..................... B29D 7/01 | |

FOREIGN PATENT DOCUMENTS

| | | | | |
|---|---|---|---|---|
| CN | 106928660 A | 7/2017 | | |
| JP | H01-311172 A | 12/1989 | | |
| JP | H0841247 A | 2/1996 | | |
| JP | 2003-342431 A | 12/2003 | | |
| JP | 2003-342478 A | 12/2003 | | |
| JP | 3501241 B | * 12/2003 | ............. | B29C 45/00 |
| JP | 2004-338393 A | 12/2004 | | |
| JP | 2006-233118 A | 9/2006 | | |
| JP | 2020-167336 A | 10/2020 | | |
| WO | 2021/177402 A1 | 9/2021 | | |

OTHER PUBLICATIONS

Machine tanslation of JP 3501241 B (Year: 2003).*
Text from PE2E for JP 3501241 B (Year: 2003).*
International Search Report received for PCT Patent Application No. PCT/JP2023/022058, mailed on Aug. 15, 2023, 3 pages (English Translation only).

* cited by examiner

*Primary Examiner* — Geraldina Visconti
(74) *Attorney, Agent, or Firm* — ArentFox Schiff LLP

(57) ABSTRACT

A liquid crystal polymer film that includes: a liquid crystal polymer; and an inorganic filler, wherein a relative permittivity of the liquid crystal polymer film is 5 to 10, and an average value of distances between barycentric coordinates of particles of the inorganic filler in the liquid crystal polymer film is 0.5 µm to 2.0 µm.

20 Claims, 3 Drawing Sheets

LIQUID CRYSTAL POLYMER FILM, LAMINATED BODY INCLUDING THE LIQUID CRYSTAL POLYMER FILM, AND METHOD OF PRODUCING LIQUID CRYSTAL POLYMER FILM

CROSS REFERENCE TO RELATED APPLICATIONS

The present application is a continuation of International application No. PCT/JP2023/022058, filed Jun. 14, 2023, which claims priority to Japanese Patent Application No. 2022-123967, filed Aug. 3, 2022, the entire contents of each of which are incorporated herein by reference.

TECHNICAL FIELD

The present disclosure relates to a liquid crystal polymer film, a laminated body including the liquid crystal polymer film, and a method of producing a liquid crystal polymer film.

BACKGROUND ART

Japanese Patent Application Laid-Open No. 2006-233118 (Patent Document 1) discloses a resin composition for an antenna part containing a liquid crystalline resin and ceramic powder. Japanese Patent Application Laid-Open No. 2020-167336 (Patent Document 2) discloses an element built-in substrate including an element formation layer formed inside a substrate body including a liquid crystal polymer and including an insulating region in which a functional filler for forming an element is dispersed.

Patent Document 1: Japanese Patent Application Laid-Open No. 2006-233118

Patent Document 2: Japanese Patent Application Laid-Open No. 2020-167336

SUMMARY OF THE DISCLOSURE

A liquid crystal polymer film formed by mixing a liquid crystal polymer with an inorganic filler having a high relative permittivity has a high relative permittivity. Thus, when the liquid crystal polymer film containing the inorganic filler is used for a high frequency antenna substrate and the like, a radiation electrode area of the high frequency antenna substrate can be sufficiently reduced.

Here, the liquid crystal polymer has a small linear expansion coefficient in an alignment direction of molecules and a large linear expansion coefficient in a direction perpendicular to the alignment direction. For this reason, in the liquid crystal polymer film, the molecules of the liquid crystal polymer are preferably aligned along an in-plane direction of a main surface of the film in order to reduce the linear expansion coefficient in the in-plane direction of the main surface of the film. This is because, when a liquid crystal polymer film is stacked on, for example, a copper foil to produce a flexible copper-clad laminate (FCCL), if the linear expansion coefficient of the main surface of the film in the in-plane direction is small, it is possible to suppress warpage and distortion of the FCCL caused by the difference in linear expansion coefficient between the liquid crystal polymer film and a copper plate.

However, when the inorganic filler is mixed with the liquid crystal polymer, the alignment of the molecules of the liquid crystal polymer along the in-plane direction of the liquid crystal polymer main surface is disturbed, so that the linear expansion coefficient in the in-plane direction of the main surface of the liquid crystal polymer film increases. In the FCCL including such a liquid crystal polymer film, a difference in linear expansion coefficient between the liquid crystal polymer film and the copper foil increases in the in-plane direction of the main surface of the FCCL, and warpage or distortion occurs in the FCCL.

The present disclosure has been made in view of the above problems, and an object of the present disclosure is to provide a liquid crystal polymer film having a relative permittivity increased by addition of an inorganic filler while suppressing an increase in linear expansion coefficient in an in-plane direction of a main surface of the film.

A liquid crystal polymer film according to the present disclosure includes: a liquid crystal polymer; and an inorganic filler. The liquid crystal polymer film has a relative permittivity of 5 to 10, and an average value of distances between barycentric coordinates of particles of the inorganic filler in the liquid crystal polymer film is 0.5 μm to 2.0 μm.

According to the present disclosure, a distance between the inorganic fillers is secured to some extent in the liquid crystal polymer film. Thus, the inorganic filler is not locally and densely present. Thus, it is possible to prevent orientation of molecules of a liquid crystal polymer in an in-plane direction of a main surface of the film from being inhibited by the inorganic filler. As a result, it is possible to provide a liquid crystal polymer film having a relative permittivity increased by addition of the inorganic filler while suppressing an increase in linear expansion coefficient in the in-plane direction of the main surface of the film.

DETAILED DESCRIPTION OF THE INVENTION

Figure 1:
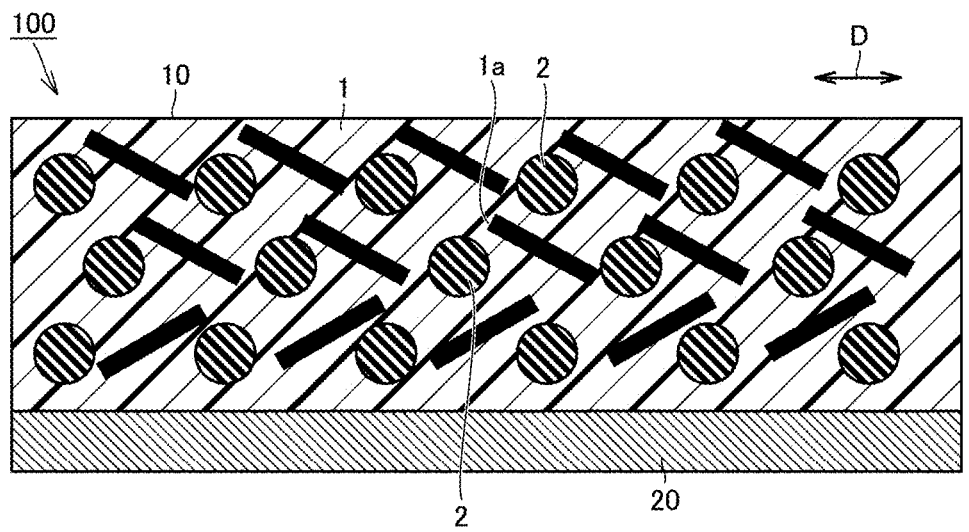
FIG. 1 is a schematic sectional view of a laminated body according to one embodiment of the present disclosure.

Hereinafter, one embodiment of the present disclosure will be described, but the present disclosure is not limited thereto. The same or corresponding portions in the drawings are designated by the same reference symbols and the description thereof will not be repeated.

<Laminated Body>

A laminated body according to one embodiment of the present disclosure includes a liquid crystal polymer film (LCP film) and a conductor layer stacked on the liquid crystal polymer film. In the laminated body according to one embodiment of the present disclosure, a linear expansion coefficient in an in-plane direction of a main surface of the liquid crystal polymer film is suppressed to be relatively low as described later, so that a difference in linear expansion coefficient between the liquid crystal polymer film and the conductor layer is relatively small. Thus, warpage is suppressed in the laminated body according to the present embodiment. A warpage amount of the laminated body is preferably 10 mm or less. When the warpage amount of the laminated body is 10 mm or less, the laminated body can be suitably used as a flexible copper-clad laminate plate when the conductor layer is a copper foil. In the present specification, the warpage amount of the laminated body is a value obtained by leaving a test piece obtained by cutting the laminated body into a 150 mm square as viewed from a stacking direction on a reference plane so that the conductor layer is in contact with the reference plane, then measuring a distance from the reference plane for each of four corner portions of the test piece, and averaging the measured values of these four distances.

As described above, the conductor layer may be, for example, a copper foil made of copper. When the conductor layer is a copper foil, the laminated body may be a so-called flexible copper-clad laminate plate (FCCL). The conductor layer may be formed in a circuit pattern shape. In addition, a via hole may be formed in the liquid crystal polymer film, and a resin layer and another conductor layer may be further stacked on the conductive layer. As described above, the laminated body may be a so-called flexible printed board.

<Liquid Crystal Polymer Film>

A liquid crystal polymer film (LCP film) according to one embodiment of the present disclosure contains a liquid crystal polymer (LCP) and an inorganic filler.

The liquid crystal polymer film according to one embodiment of the present disclosure has a relative permittivity of 5 to 10 when measured by applying a high frequency signal of 12 GHz at an ambient temperature of 25° C. by a cavity resonator method in accordance with JIS R 1641. If the relative permittivity of the liquid crystal polymer film is less than 5, when the liquid crystal polymer film is used for a high frequency antenna substrate and the like, the radiation electrode area of the high frequency antenna substrate cannot be sufficiently reduced. When the relative permittivity of the liquid crystal polymer film is more than 10, antenna efficiency is deteriorated.

The liquid crystal polymer film according to one embodiment of the present disclosure preferably has a dielectric loss tangent of 0.01 or less when measured by applying a high frequency signal of 30 GHz at an ambient temperature of 25° C. by a cavity resonator method in accordance with JIS R 1641. When the dielectric loss tangent of the LCP film is 0.01 or less, deterioration of the antenna efficiency can be suppressed when the LCP film is used for a high frequency antenna substrate.

(Liquid Crystal Polymer)

The liquid crystal polymer is not particularly limited, and examples thereof include a thermotropic liquid crystal polymer. The thermotropic liquid crystal polymer is, for example, an aromatic polyester synthesized mainly containing a monomer such as an aromatic diol, an aromatic dicarboxylic acid, or an aromatic hydroxycarboxylic acid, and exhibits liquid crystallinity during melting.

A molecule of the liquid crystal polymer has a negative linear expansion coefficient (CTE) in an axial direction of a molecular axis and a positive CTE in a radial direction of the molecular axis.

The liquid crystal polymer preferably has no amide bond. Examples of the thermotropic liquid crystal polymer having no amide bond include a copolymer of parahydroxybenzoic acid, terephthalic acid, and dihydroxybiphenyl (a block copolymer of parahydroxybenzoic acid and ethylene terephthalate) having a high melting point and a low CTE, which is called a type-1 liquid crystal polymer, and a copolymer of parahydroxybenzoic acid and 2,6-hydroxynaphthoic acid (a block copolymer) having a melting point between a type-1 liquid crystal polymer and a type-2 liquid crystal polymer, which is called type-1.5 (or type-3).

(Liquid Crystal Polymer Powder)

The LCP film according to one embodiment of the present disclosure can be produced by a production method to be described later using liquid crystal polymer powder (LCP powder) composed of the liquid crystal polymer described above. The LCP powder contains fibrous particles made of a liquid crystal polymer (liquid crystal polymer fibers: LCP fibers).

The LCP fibers contained in the LCP powder are not particularly limited as long as they contain a fibrous portion. The fibrous portion may be linear or may have branching or the like.

An average diameter of the LCP fibers is 2 μm or less, preferably 1.4 μm or less, and more preferably 1 μm or less. The average diameter of the LCP fibers is, for example, 0.07 μm or more. The smaller the average diameter of the LCP fibers, the less a riding between the LCP fibers during production of the LCP film. As a result, this facilitates an in-plane orientation of the LCP during production of the LCP film, thereby reducing the linear expansion coefficient (CTE) in the main surface of the LCP film and amount of warpage of the flexible copper-clad laminate (FCCL). Moreover, the average aspect ratio of the LCP fibers is preferably 10 to 500, and more preferably 10 to 300.

Note that, the average diameter and average aspect ratio of the LCP fibers are measured by the following method.

First, the LCP powder composed of the LCP fibers to be measured is dispersed in ethanol to prepare a slurry in which 0.01 mass % of the LCP powder is dispersed. At this time, the slurry was prepared so that a moisture content in the slurry was 1 mass % or less. Then, 5 μL to 10 μL of this slurry was dropped onto a slide glass, and then the slurry on the slide glass was naturally dried. The LCP powder is disposed on the slide glass by naturally drying the slurry.

Next, a predetermined region of the LCP powder disposed on the slide glass is observed with a scanning electron microscope (SEM) to collect 100 or more pieces of image data of the particles (the LCP fibers) constituting the LCP powder. Note that, in the collection of the image data, the region was set according to the size per particle of the LCP so that the number of image data was 100 or more. Moreover, for each particle of the LCP, the image data was collected by appropriately changing a magnification of the SEM to 500 times, 3,000 times, or 10,000 times in order to suppress leakage of the collection of the image data and occurrence of a measurement error.

Next, a longitudinal direction dimension and a width direction dimension of each of the LCP fibers are measured using the collected image data. In one of the LCP fibers photographed in each piece of the image data, a direction of a straight line connecting both ends of a longest path in a path from one end portion to an end portion opposite to the one end portion through substantially a center of the particle is defined as a longitudinal direction. Then, a length of a straight line connecting both ends of the longest path is measured as the longitudinal direction dimension.

Moreover, a particle dimension of one particle of the LCP powder in a direction orthogonal to the longitudinal direction was measured at three different points in the longitudinal direction. An average value of the dimensions measured at these three points was taken as the width direction dimension (fiber diameter) per particle of the LCP powder. Then, the average value of the fiber diameters measured for 100 LCP fibers is taken as the average diameter.

Furthermore, a ratio of the longitudinal direction dimension to the fiber diameter [longitudinal dimension/fiber diameter] is calculated and taken as the aspect ratio of the LCP fibers. Then, the average value of the aspect ratios measured for 100 LCP fibers is taken as the average aspect ratio.

Note that, the fibrous particles may be contained in the LCP powder as an aggregate in which the fibrous particles are aggregated.

Moreover, in the fibrous particles, the axial direction of the LCP molecules constituting the fibrous particles and the longitudinal direction of the fibrous particles tend to coincide with each other. Note that, it is considered that this is because, in a case where the LCP powder is produced, the axial direction of the LCP molecules is oriented along the longitudinal direction of the fibrous particles due to breakage between a plurality of domains formed by bundling the LCP molecules.

In the LCP powder, a content (a number ratio) of particles other than the fibrous particles (massive particles that are not substantially fibrous) is preferably 20% or less. For example, when the LCP powder is placed on a plane, particles having a maximum height of 10 μm or less are fibrous particles, and particles having a maximum height of more than 10 μm are massive particles.

The LCP powder preferably has a D50 (an average particle size) value of 13 μm or less as measured by particle size measurement using a particle size distribution measuring device by a laser diffraction scattering method.

(Inorganic Filler)

As a filler raw material (inorganic filler), for example, powder of an inorganic oxide such as talc, alumina, silica, or alkaline earth metal titanate, carbon powder, ceramic powder, glass powder, or the like can be used. In the present embodiment, the inorganic filler is preferably an alkaline earth metal titanate. Since the alkaline earth metal titanate is a ferroelectric, the relative permittivity of the liquid crystal polymer film can be effectively increased by adding the alkaline earth metal titanate to the liquid crystal polymer. Examples of the alkaline earth metal titanate include barium titanate ($BaTiO_3$), calcium titanate ($CaTiO_3$), and strontium titanate ($SrTiO_3$). Among them, the inorganic filler is preferably barium titanate. Since barium titanate is a ferroelectric having a particularly high relative permittivity, the relative permittivity of the liquid crystal polymer film can be more effectively increased. The inorganic filler is also preferably calcium titanate or strontium titanate. By adding calcium titanate or strontium titanate, an increase in dielectric loss of the liquid crystal polymer film can be suppressed. The filler raw materials may be used singly or in combination of two or more kinds thereof.

A shape of the filler raw material is not particularly limited, and an amorphous filler, a plate-like filler, a granular filler, or the like can be used. The inorganic filler of the present disclosure preferably contains a flat filler. The "flat filler" in one embodiment of the present disclosure includes a filler obtained by heating and compressing a filler (hereinafter, sometimes referred to as a "filler raw material") used as a raw material, a filler raw material that is flat, a filler obtained by aggregating filler raw materials such as spherical filler raw materials to form flat aggregates, and the like.

The inorganic filler preferably has a D50 (average particle size) value of 0.5 μm to 1.5 μm as measured by particle size measurement using a particle size distribution measuring device by a laser diffraction scattering method. When the average particle size of the inorganic filler is 0.5 μm or more, a contact area between the inorganic filler and the LCP is not excessively increased, so that generation of a void between the inorganic filler and the LCP is suppressed. As a result, moldability of the LCP film is improved. When the average particle size of the inorganic filler is 1.5 μm or less, generation of irregularities on the main surface of the LCP film due to an outer shape of the inorganic filler is suppressed, and the moldability of the LCP film is improved.

Moreover, the average particle size of the filler raw material is preferably smaller than the average diameter of the LCP fibers. When the filler is mixed with the LCP, the orientation of the LCP fibers is disturbed, but in this way, disturbance of the orientation of the LCP fibers can be suppressed.

In one embodiment of the present disclosure, a content ratio of the inorganic filler to a total content of the liquid crystal polymer and the inorganic filler is preferably 20 vol % to 30 vol %. When the ratio is 20 vol % or more, the relative permittivity of the liquid crystal polymer film due to the inorganic filler can be more effectively increased. When the ratio is 30 vol % or less, the contact area between the inorganic filler and the LCP is not excessively increased, so that generation of a void between the inorganic filler and the LCP is suppressed.

The inorganic filler in one embodiment of the present disclosure preferably has an average aspect ratio of 3 or more, and more preferably 4 or more. When the inorganic filler has an average aspect ratio of 3 or more, the LCP molecules are easily oriented along the in-plane direction of the main surface of the LCP film, so that the CTE in the main surface of the LCP film can be further reduced. The inorganic filler also includes a filler having a flat shape such as a sheet shape, a phosphorus piece shape, or a flake shape. Here, the average aspect ratio of the filler is an average value of aspect ratios calculated by measuring a major axis and a minor axis of a plurality of fillers by a method to be described later. The major axis represents a diameter of the filler in the longest direction, and the minor axis represents the longest length in a direction perpendicular to the major axis. The aspect ratio of each filler is a ratio of the major axis to the minor axis.

An average inclination of the inorganic filler with respect to the in-plane direction of the main surface of the LCP film in one embodiment of the present disclosure is preferably 15° or less, and more preferably 10° or less. When the average inclination of the filler with respect to the in-plane direction of the main surface of the LCP film is 15° or less, the LCP molecules are easily oriented along the in-plane direction of the main surface of the LCP film, so that the CTE in the main surface of the LCP film can be further reduced.

FIG. 1 is a schematic sectional view of the laminated body according to one embodiment of the present disclosure. As shown in FIG. 1, in one embodiment of the present disclosure, an average value of distances between barycentric coordinates of particles of an inorganic filler 2 in a liquid crystal polymer film 10 is 0.5 μm to 2.0 μm or less. When the average value of the distances between the barycentric coordinates is 0.5 μm or more, an inter-particle distance between the inorganic fillers 2 is secured to some extent.

Thus, the inorganic filler 2 is not locally and densely present. Thus, it is possible to prevent orientation of a molecular axis 1*a* of a liquid crystal polymer 1 in an in-plane direction D of a main surface of the LCP film 10 from being inhibited by the inorganic filler 2. As a result, an increase in the linear expansion coefficient of the main surface of the LCP film 10 in the in-plane direction D can be suppressed. When the average value of the distances between the barycentric coordinates is 2.0 μm or less, the effect of increasing the relative permittivity due to the addition of the inorganic filler to the LCP film can be sufficiently obtained. In FIG. 1, in a laminated body 100, the liquid crystal polymer film 10 is stacked on the conductor layer 20.

Figure 2:
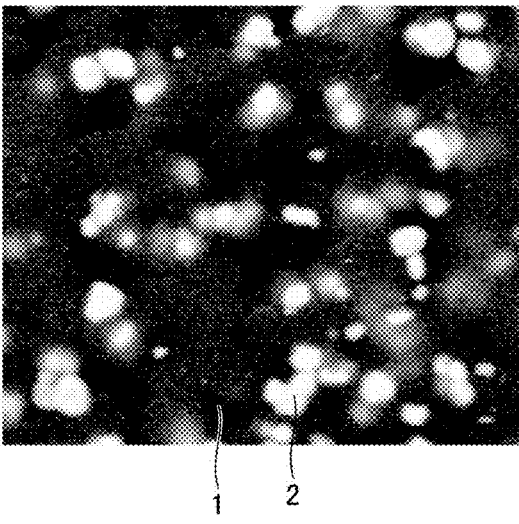
FIG. 2 is an image showing an example of a photograph of a cross section of an LCP film according to one embodiment of the present disclosure taken by a reflected electron image of an SEM.

The average aspect ratio of the inorganic filler, the average inclination with respect to the thickness direction of the LCP film, and the average value of the distances between the barycentric coordinates of the particles in the LCP film are determined by solidifying a periphery of an arbitrary cross section of the LCP film or the FCCL containing the inorganic filler to be measured with a resin, mechanically polishing the periphery, photographing the polished cross section by a reflected electron image of SEM, and analyzing the photographed image. FIG. 2 is an image showing an example of a photograph of a cross section of the LCP film according to one embodiment of the present disclosure taken by a reflected electron image of the SEM. As shown in FIG. 2, in the photographed image, a black region is a region mainly indicating the presence of the LCP1, and a white region is a region mainly indicating the inorganic filler 2.

The inorganic filler and the LCP (powder) can be identified by binarizing the SEM image using image processing software ("ImageJ") as image analysis software. Here, binarization processing refers to processing of converting a density of each pixel into two values of 1 and 0 with a constant reference value (a threshold).

Figure 3:
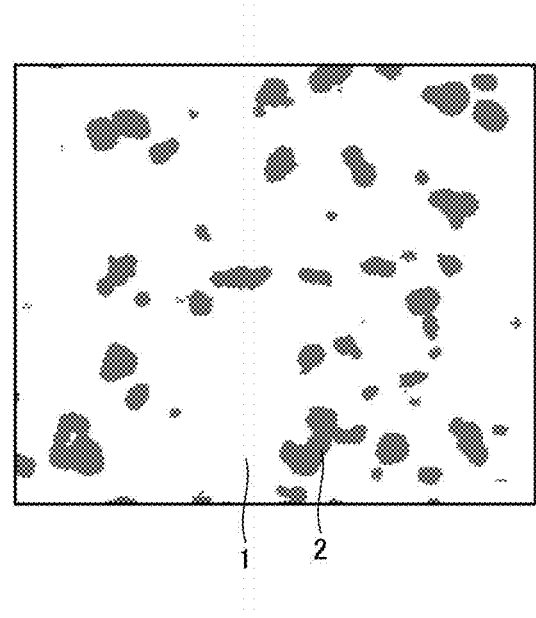
FIG. 3 is a view showing an example of a binarized image obtained by binarizing a photographed image of a cross section of an LCP film according to one embodiment of the present disclosure.

Specifically, the binarization processing for recognizing the filler is performed on the SEM image using image processing software ("ImageJ") to obtain a binarized image. Here, the binarization processing is performed, for example, based on brightness of the pixel. Although there is no clear value in a threshold value of the brightness in the binarization processing, it is preferable to prepare the threshold value so that the ratio of a bright portion to a dark portion matches an actual volume mixing ratio of the LCP powder and the filler. FIG. 3 is a view showing an example of a binarized image obtained by binarizing a photographed image of a cross section of the LCP film according to one embodiment of the present disclosure. As shown in FIG. 3, in the binarized image, the bright portion and the dark portion correspond to the LCP1 and the inorganic filler 2, respectively.

Based on the binarized image, the major axis, the minor axis, and the inclination with respect to the thickness direction of the LCP film of the plurality of fillers in the microscopic image and the average value of the distances between the barycentric coordinates of the particles in the LCP film are calculated. Here, the number of fillers to be measured is at least 50 or more, and preferably 100 or more. Moreover, it is preferable to perform image analysis in a plurality of fields of view in the same LCP film or FCCL, but in a case where the image analysis is performed in a single field of view, the image analysis of 50 or more fillers may be performed as described above, and the average value thereof may be used as the average aspect ratio and the average inclination with respect to the thickness direction of the LCP film. In the present disclosure, values measured for 50 or more fillers are taken as the average aspect ratio, the average inclination, and the average value of the distances between the barycentric coordinates of the particles. The field of view may be, for example, 50 μm long by 100 μm wide. Note that, a filler having an aspect ratio of the major axis to the minor axis of 1.1 or less is regarded as a true sphere, and the aspect ratio is set to 1 and the inclination is set to 45°.

Regarding the average aspect ratio of the filler, first, an area of each filler is measured by the following Formula (1).

$$\text{Area}(\mu m^2)=\text{radius of major axis}(\mu m)\times\text{radius of minor axis}(\mu m)\times\text{circular constant} \qquad \text{Formula (1)}$$

Next, an average of the areas measured for 50 or more fillers is taken as the average area, and an area average ratio of each filler is determined by the following Formula (2).

$$\text{Area average ratio}=\text{area}(\mu m^2)\div\text{average area }(\mu m^2) \qquad \text{Formula (2)}$$

Then, the larger the sectional area of the filler, the greater the influence on the orientation of many LCP fibers and the influence on the CTE, and thus a corrected aspect ratio of the filler is obtained by the following Formula (3).

$$\text{Corrected aspect ratio}=\text{actually measured aspect ratio}\times\text{area average ratio} \qquad \text{Formula (3)}$$

In the present disclosure, the average of the corrected aspect ratios is taken as the average aspect ratio.

Moreover, the larger the sectional area of the filler, the greater the influence on the orientation of many LCP fibers and the influence on the CTE, and thus the correction inclination of the filler is obtained by the following Formula (4).

$$\text{Corrected inclination}(°)=\text{measured inclination}(°)\times\text{area average ratio} \qquad \text{Formula (4)}$$

In the present disclosure, an average of the corrected inclination is taken as the average inclination.

Figure 4:
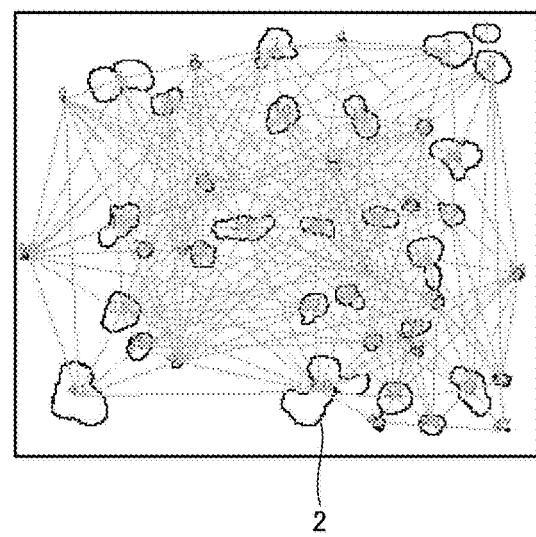
FIG. 4 is a view schematically showing a state in which an average value of distances between barycentric coordinates of an inorganic filler is measured from the binarized image of the cross section of the LCP film according to one embodiment of the present disclosure.

Regarding the average value of the distances between the barycentric coordinates of the inorganic filler particles in the LCP film, first, the center coordinates (barycentric coordinates) of each inorganic filler particle in the binarized image are calculated. Then, a distance between the center coordinates of one specific inorganic filler particle and the center coordinates of each of the other plurality of inorganic filler particles is measured. Among the measured distances, the smallest distance is defined as a distance between the barycentric coordinates of the one inorganic filler particle. The average value of the distances between the barycentric coordinates of the 50 or more inorganic filler particles to be measured is taken as the average value of the distances between the barycentric coordinates of the inorganic filler in the LCP film. FIG. 4 is a view schematically showing a state in which the average value of the distances between the barycentric coordinates of the inorganic filler is measured from the binarized image of the cross section of the LCP film according to one embodiment of the present disclosure. As shown in FIG. 4, in the binarized image, for each particle of the inorganic filler 2 to be measured, the distance between the barycentric coordinates of the particle and the other plurality of particles is measured.

(Additive)

The liquid crystal polymer film may further contain an additive. Examples of the additive include a dispersant, a leveling agent, a stabilizer, a surfactant, and a silane coupling agent. The liquid crystal polymer film preferably contains, as an additive, a dispersant for dispersing the inorganic filler in the LCP film well or a silane coupling agent. Examples of the dispersant include an acrylic dispersant. Examples of the silane coupling agent include a methacrylic silane coupling agent. The liquid crystal polymer film may not contain additives such as a dispersant and a silane coupling agent.

The content of the dispersant or the silane coupling agent in the LCP is, for example, preferably 0.1 mass % or more, more preferably 0.2 mass % or more, and still more preferably 0.5 mass % or more with respect to the content of the inorganic filler in the LCP film. When the content of the dispersant or the silane coupling agent is 0.1 mass % or more with respect to the content of the inorganic filler, the inorganic filler is well dispersed in the LCP. The upper limit of the content of the dispersant or the silane coupling agent in the LCP is not particularly limited. The content of the dispersant or the silane coupling agent in the LCP may be, for example, 3 mass % or less with respect to the content of the inorganic filler in the LCP film.

<Method of Producing Liquid Crystal Polymer Film>

Hereinafter, each step of the production method of the present embodiment will be described.

Figure 5:
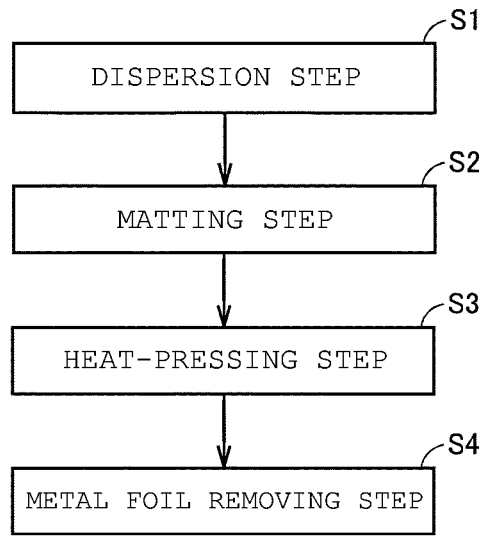
FIG. 5 is a flowchart showing a process for producing the liquid crystal polymer film according to one embodiment of the present disclosure.

FIG. 5 is a flowchart showing a process for producing the liquid crystal polymer film according to one embodiment of the present disclosure. As shown in FIG. 5, the method of producing a liquid crystal polymer film according to the present embodiment includes a dispersion step (S1), a matting step (S2), a heat-pressing step (S3), and a metal foil removing step (S4).

First, a method for producing the LCP powder used in the dispersion step (S1) will be described in detail. The LCP powder can be prepared, for example, by performing the following coarse pulverizing step, fine pulverizing step, coarse particle removing step, and fiberizing step in this order.

Examples of the shape of an LCP-containing raw material (an LCP raw material) used for producing the LCP powder include uniaxially oriented pellets, biaxially oriented films, and powdery LCP. The LCP constituting the LCP raw material is similar to the LCP constituting the LCP fibers described above.

(Coarse Pulverizing Step)

In the coarse pulverizing step, the LCP raw material is coarsely pulverized. For example, the LCP raw material is coarsely pulverized with a cutter mill. A size of the particles of the coarsely ground LCP is not particularly limited as long as the particles can be used as a raw material in the finely grinding step described later. A maximum particle size of the coarsely ground LCP is, for example, 3 mm or less.

Note that, the coarse pulverizing step is not necessarily performed. For example, if the LCP raw material can be used as a raw material in the fine pulverizing step, the LCP raw material may be directly used as a raw material in the fine pulverizing step.

(Fine Pulverizing Step)

In the fine pulverizing step, the LCP raw material (after the coarse pulverizing step) is pulverized in a state of being dispersed in liquid nitrogen to obtain a granular finely pulverized liquid crystal polymer (finely pulverized LCP).

In the fine pulverizing step, it is preferable that the LCP raw material which is dispersed in the liquid nitrogen is pulverized using a medium. The medium is, for example, a bead. In the finely grinding step of the present embodiment, it is preferable to use a bead mill having relatively few technical problems from a viewpoint of handling liquid nitrogen. Examples of the apparatus that can be used in the finely grinding step include "LNM-08" which is a liquid nitrogen bead mill manufactured by AIMEX CO., LTD.

The granular finely ground LCP obtained by the finely grinding step preferably has a D50 of 50 μm or less as measured by a particle size distribution measuring apparatus by a laser diffraction scattering method. This makes it possible to suppress clogging of the granular finely ground LCP with the nozzle in the following fiberizing step.

(Coarse Particle Removing Step)

Next, in the coarse particle removing step, coarse particles are removed from the granular finely ground LCP obtained in the finely grinding step. For example, the granular finely pulverized LCP is sieved with a mesh to obtain the granular finely pulverized LCP under the sieve, and the coarse particles contained in the granular finely pulverized LCP can be removed by removing the granular LCP on the sieve. A type of mesh may be appropriately selected, and examples of the mesh include a mesh having an opening of 53 μm. Note that, the coarse particle removing step is not necessarily performed.

(Fiberizing Step)

Next, in the fiberizing step, the granular LCP is crushed by a wet high-pressure crushing device to obtain LCP powder. In the fiberizing step, first, the finely ground LCP is dispersed in a dispersing medium for the fiberizing step. In the finely ground LCP to be dispersed, the coarse particles may not be removed, but it is preferable that the coarse particles are removed. Examples of the dispersing medium for the fiberizing step include water, ethanol, methanol, isopropyl alcohol, toluene, benzene, xylene, phenol, acetone, methyl ethyl ketone, diethyl ether, dimethyl ether, hexane, and mixtures thereof.

Then, the finely ground LCP in a state of being dispersed in the dispersing medium for the fiberizing step, that is, the paste-like or slurry-like finely ground LCP is passed through the nozzle in a state of being pressurized at high pressure. By passing through the nozzle at a high pressure, a shearing force or collision energy due to a high-speed flow in the nozzle acts on the LCP, and the granular finely pulverized LCP is crushed, so that the fiberization of the LCP proceeds and LCP powder consisting of fine LCP fibers can be obtained. The pressure during pressurization is, for example, 100 MPa to 300 MPa. A nozzle diameter of the nozzle is preferably as small as possible within a range in which clogging of the finely ground LCP does not occur in the nozzle from a viewpoint of applying high shear force or high collision energy. Since the granular finely pulverized LCP has a relatively small particle size, the nozzle diameter in the wet high-pressure crushing device used in the fiberizing step can be reduced. The nozzle diameter is, for example, 0.2 mm or less.

Note that, as described above, a plurality of fine cracks are formed in the granular finely pulverized LCP. Therefore, the dispersing medium enters into the finely ground LCP through fine cracks by pressurization in a wet high-pressure crushing device. Then, when the paste-like or slurry-like finely ground LCP passes through the nozzle and is positioned under normal pressure, the dispersing medium that has entered the finely ground LCP expands in a short time. When the dispersing medium that has entered the finely ground LCP expands, destruction progresses from inside of the finely ground LCP. Therefore, the fiberization proceeds to the inside of the finely pulverized LCP, and the molecules of the LCP are separated into domain units arranged in one direction. As described above, in the fiberizing step according to the present embodiment, by defiberizing the granular finely pulverized LCP obtained in the fine pulverizing step in the present embodiment, it is possible to obtain the LCP powder which has a low content of massive particles and consists of fine LCP fibers as compared with the LCP powder obtained by crushing the granular LCP obtained by a conventional freeze pulverizing method.

Note that, in the fiberizing step in the present embodiment, the finely pulverized LCP may be pulverized by the wet high-pressure crushing device a plurality of times to obtain the LCP powder, but from a viewpoint of production efficiency, the number of times of crushing by the wet high-pressure crushing device is preferably small, and is, for example, 5 times or less. Moreover, from a viewpoint of obtaining the LCP powder having a smaller average diameter, the number of times of crushing by a wet high-pressure crushing device is preferably large, and is, for example, 6 times to 90 times.

(Dispersion Step: S1)

In the dispersion step, which is a first step of the method of producing the LCP film, the LCP powder and the filler raw material are dispersed in the dispersing medium to form a paste or slurry. As described above, in the present embodiment, since the fine fibrous LCP powder and the filler raw material having a small average particle size are used, the LCP powder and the filler raw material can be dispersed in a dispersing medium having a high viscosity. Thus, a homogeneous LCP film can be produced.

Examples of the dispersing medium used in the dispersion step include butanediol, water, ethanol, terpineol, and a mixture of water and ethanol. For example, in a case where butanediol is used as the dispersing medium, a mixture of a paste-like LCP powder and a filler is obtained. In a case where a mixture of water and ethanol is used as the dispersing medium, a mixture of the slurry-like LCP powder and the filler is obtained.

Additives such as a dispersant and a silane coupling agent may be further added to the mixture of the LCP powder and the filler. As a result, the LCP powder and the filler raw material are well dispersed in the mixture.

A mixing ratio of the LCP powder and the filler raw material may be, for example, from 5:5 to 8:2 by volume ratio. If a volume ratio of the filler raw material is larger than that of the LCP powder, since the filler is a main component in the mixture, it is difficult to form a film from the mixture. Moreover, it is more preferable that the LCP powder and the filler raw material are mixed at a volume ratio of 7:3 to 8:2. In other words, in the liquid crystal polymer film, the LCP filler and the inorganic filler raw material are more preferably mixed such that the ratio of the content of the inorganic filler to the total content of the liquid crystal polymer and the inorganic filler is 20 vol % to 30 vol %.

(Matting Step: S2)

Next, in the matting step, a mixture of the paste-like or the slurry-like LCP powder and the filler is dried to form a liquid crystal polymer fiber mat (an LCP fiber mat). In one embodiment of the present disclosure, the matting step includes, for example, an application step and a drying step.

In the applying step, a mixture of the paste-like LCP powder and the filler is applied to a metal foil such as a copper foil. In the applying step, the mixture of the paste-like LCP powder and the filler is applied onto a metal foil such as a copper foil as described above, but instead of the metal foil, a composite sheet or the like composed of a reinforcing material such as a polyimide film, a PTFE film, or a glass fiber woven fabric, and a heat-resistant resin which hardly adheres to LCP may be used. As a result, this makes it easy to industrially produce an LCP film.

Next, in the drying step, the mixture of the paste-like LCP powder and the filler applied to the copper foil is heated and dried to vaporize the dispersing medium. By the above heating and drying, the LCP fiber mat is formed on the metal foil such as a copper foil.

Moreover, in the drying step, since the dispersing medium is gradually removed from the mixture of the paste-like LCP powder and the filler, a total thickness of the mixture of the paste-like LCP powder and the filler gradually decreases during drying. Therefore, a thickness of the LCP fiber mat is thin compared to a total thickness of the mixture of the paste-like LCP powder and the filler formed on the copper foil.

Furthermore, as the total thickness of the mixture of the paste-like LCP powder and the filler gradually decreases during drying, a longitudinal direction of the fibrous particles in the LCP powder changes. Specifically, among the fibrous particles, the fibrous particles having the longitudinal direction in the entire thickness direction of the mixture of the paste-like LCP powder and the filler are inclined such that the longitudinal direction is directed in the in-plane direction of the main surface of the copper foil. Therefore, there is anisotropy in the longitudinal direction of the fibrous particles in the formed LCP fiber mat.

In the matting step, the dispersing medium may be vaporized by further applying a mixture of the paste-like LCP powder and the filler onto the LCP fiber mat formed on the metal foil in the drying step, and then drying the applied mixture. As described above, the matting step may include the application step and the drying step repeatedly in this order. As a result, an LCP fiber mat having a desired basis weight can be obtained. Moreover, in a case where the applying step and the drying step are repeatedly performed, a mixture in which the mixing ratio of the LCP powder and the filler is changed for each applying step may be used. As a result, this makes it possible to obtain the LCP fiber mat capable of forming the LCP film having desired properties.

In the matting step in the present embodiment, a mixture of the slurry-like LCP powder and the filler may be formed into the LCP fiber mat by a papermaking method instead of the applying step and the drying step. According to the papermaking method, it is not necessary to use a special dispersing medium used in the application step, for example, expensive terpineol. Moreover, in the papermaking method, the dispersing medium used in the dispersion step can be recovered and reused easily. As described above, the LCP film can be produced at low cost by the papermaking method.

In the matting step using the papermaking method, specifically, first, a slurry-like LCP powder and a filler are paper-made on a mesh, a nonwoven fabric-like microporous sheet, or a woven fabric. Then, the mixture of the slurry-like LCP powder and the filler disposed on the mesh is heated and dried to obtain the LCP fiber mat.

(Heat-Pressing Step: S3)

Next, in the heat-pressing step, the LCP fiber mat is heat-pressed to obtain the LCP film. Moreover, by heat-pressing the LCP fiber mat, the filler raw material or the aggregate of the filler raw material becomes flat, and the filler is oriented so as to have an inclination of 150 or less with respect to the in-plane direction of the main surface of the LCP film. Specifically, in the heat-pressing step, the LCP fiber mat is heat-pressed together with the copper foil. As a result, the heat-pressing step also serves as a step of bonding the LCP film and the copper foil to each other, so that the LCP film to which the copper foil is bonded can be obtained at low cost. Note that, in the case where the LCP fiber mat is heated for a long time in the heat-pressing step, it is preferable that the LCP fiber mat is heated and pressed in a vacuum.

Heating in the heat-pressing step is performed to bond the LCP fibers to each other. However, in order to easily make the filler raw material or the aggregate of the filler raw material flat, in a case where the average particle size of the filler raw material exceeds 1 µm, it is preferable to heat-press the filler raw material in a range of ±10° C. of the melting point of the filler raw material. Note that, in a case where the average particle size of the filler raw material is 1 µm or less, the orientation of the LCP fibers is hardly disturbed, and therefore a heating temperature is not limited. However, in a case where the LCP fibers are surface-treated with ultraviolet rays and in a case where the filler raw material is plasma-treated, from a viewpoint of bonding the LCP fibers and the filler raw material to each other at an interface between the LCP fibers and the filler raw material, the heating temperature in the heat-pressing step is preferably equal to or lower than the melting point of the LCP fiber.

The pressure in the heat-pressing step is preferably 3 MPa or more, more preferably 5 MPa or more in order that the filler raw material becomes flat and the filler is oriented so as to have an inclination of 15° or less with respect to the in-plane direction of the main surface of the LCP film. Note that, when the pressure is excessively increased, the LCP resin melts and flows, and thus the pressure is preferably 10 MPa or less.

Holding time in the heat-pressing step is not particularly limited, and may be, for example, 5 seconds or more, or 10 seconds or more. Moreover, since the filler raw material becomes flatter by being held for a long time, for example, the time may be 3 minutes or longer, and may be 5 minutes or longer.

Moreover, in the heat-pressing step, a polyimide film, a PTFE film, or a composite sheet including a reinforcing material such as a glass fiber fabric and a heat-resistant resin which hardly adheres to LCP may be interposed as a release film between a pressing machine to be used in the heat-pressing step and the LCP fiber mat.

Moreover, in place of the polyimide film, an additional copper foil may be interposed between the pressing machine and the LCP fiber mat. In this case, the LCP film in which copper foils are bonded to both surfaces can be obtained. The LCP film in which the copper foils are bonded to both surfaces can be used as a double-sided copper foil FCCL.

An outer dimension of the LCP film molded by the heat-pressing step as viewed from the thickness direction, that is, a planar dimension along a film surface is substantially the same as that of the LCP fiber mat before heat-pressing. Then, among the fibrous particles of the LCP powder in the LCP fiber mat, the fibrous particles having the longitudinal direction along the thickness direction of the LCP fiber mat are heated while being pushed down in the in-plane direction of the main surface of the copper foil by the heat-pressing. The LCP constituting the LCP powder has the axial direction of the molecules in the longitudinal direction of the fibrous particles, and thus the axial direction of the molecule of LCP is also pushed down in the in-plane direction of the main surface of the copper foil. Therefore, except for the molecules constituting the massive particles, the axial direction of each of the molecules constituting the LCP is oriented along the in-plane direction of the main surface of the LCP film over the thickness direction of the LCP film. Therefore, in the molded LCP film, the main orientation direction of the molecule of LCP tends to be along the in-plane direction of the main surface of the copper foil, that is, the in-plane direction of the main surface of the LCP film.

Similarly, the filler is heated while being pushed down toward the in-plane direction of the main surface of the copper foil by the heat-pressing. Thus, in the filler, the major axis thereof is oriented along the in-plane direction of the main surface of the LCP film over the thickness direction of the LCP film.

Accordingly, it is considered that the CTE inside the main surface is reduced in the LCP film of the present embodiment.

Moreover, in a case where the copper foil is bonded to the LCP film, the CTE of the LCP film can be reduced to the same extent as the CTE of the copper foil (about 18 to 20 ppm/° C.). As a result, defects such as warpage due to thermal shrinkage can be suppressed in the LCP film to which the copper foil is bonded.

(Metal Foil Removing Step: S4)

Finally, the metal foil bonded to the LCP film may be removed by etching or the like as necessary. As a result, a single LCP film to which the metal foil is not bonded is obtained.

EXAMPLES

Hereinafter, the present disclosure will be described in more detail with reference to the examples, but the present disclosure is not limited thereto.

Example 1

(Production of Liquid Crystal Polymer Powder)

In Example 1, first, uniaxially oriented pellets of LCP (cylindrical pellet having a diameter of 3 to 4 mm, melting point: 315° C.) were prepared as the LCP raw material. The material of LCP is a block copolymer of parahydroxybenzoic acid and 4,6-hydroxynaphthoic acid.

This LCP raw material was coarsely pulverized by a cutter mill (MF10, manufactured by IKA). The coarsely pulverized LCP was passed through a mesh having a diameter of 3 mm provided at a discharge port of the cutter mill to obtain a coarsely pulverized LCP.

Next, the coarsely pulverized LCP was finely pulverized with a liquid nitrogen bead mill (LNM-08 manufactured by AIMEX CORPORATION, vessel capacity: 0.8 L). Specifically, 500 mL of media and 30 g of coarsely pulverized LCP were put into a vessel, and pulverization treatment was performed at a rotation speed of 2000 rpm for 120 minutes. As the medium, beads made of zirconia (ZrO2) having a diameter of 5 mm were used. Note that, in the liquid nitrogen bead mill, wet pulverizing treatment is performed in a state in which the coarsely pulverized LCP is dispersed in the liquid nitrogen. As described above, by pulverizing the coarsely pulverized LCP with the liquid nitrogen bead mill, granular finely pulverized LCP was obtained. A dispersion liquid obtained by dispersing the finely pulverized LCP in Ekinen was sieved with a mesh having an opening of 100 µm to remove the coarse particles contained in the finely pulverized LCP, and finely pulverized LCP passing through the mesh was recovered.

Next, the finely pulverized LCP from which the coarse particles were removed was dispersed in a 50 mass % ethanol aqueous solution. An ethanol slurry in which the finely pulverized LCP was dispersed was repeatedly crushed five times using a wet high-pressure crushing device under conditions with a nozzle diameter of 0.2 mm and a pressure of 200 MPa to be formed into fibers. As the wet high-pressure crushing device, a high-pressure crushing device (Nanoveta manufactured by Yoshida Kikai Kogyo Co., Ltd.) was used. The ethanol slurry in which the finely pulverized LCP was dispersed was dried with a spray dryer to obtain the LCP powder. An average value of fiber diameters (average diameter) measured for 100 LCP fibers contained in the LCP powder was 1.4 μm.

(Production of Liquid Crystal Polymer Film)

Barium titanate powder (D50 (average particle size) of 0.5 μm as measured with a laser diffraction particle size distribution meter LA-950V2 (manufactured by HORIBA)) was provided as an inorganic filler raw material. The barium titanate powder was dispersed in butanediol so as to be 10 mass % with respect to butanediol, an additive (dispersant: acrylic dispersant) of 1 mass % with respect to barium titanate in the butanediol was further added to the butanediol, and then the mixture was stirred using a ball mill to obtain a dispersion of barium titanate.

The LCP powder was mixed with the dispersion of barium titanate to form a paste. At this time, a paste-like mixture was prepared so that the volume ratio of the LCP powder and the inorganic filler (barium titanate) was 8:2 in volume ratio.

Next, a paste-like mixture was applied onto a roughened surface of an electrolytic copper foil (FWJ-WS-12 manufactured by Furukawa Electric Co., Ltd.) having a 180 mm square and a thickness of 12 μm using a 160 mm square metal plate. Then, the electrolytic copper foil coated with the paste-like mixture was heated to 180° C. on a hot plate to vaporize butanediol as the dispersing medium, and the paste-like mixture on the electrolytic copper foil was dried. In this way, a thin LCP fiber mat was formed on an electrolytic copper foil.

The paste-like mixture was further applied onto the thin LCP fiber mat. The applied paste-like mixture was dried in the same manner as when the previously applied paste-like mixture was dried. As described above, the application and drying were repeated a plurality of times to mold the LCP fiber mat adjusted so that the basis weight was 35 g/m² on the electrolytic copper foil.

Next, the LCP fiber mat formed on the electrolytic copper foil was heat-pressed together with the electrolytic copper foil using a high-temperature pressing device. Specifically, first, the release film was stacked on an opposite side to an electrolytic copper foil side of the LCP fiber mat molded on the electrolytic copper foil. As the release film, a polyimide film (Kapton (registered trademark) 100H manufactured by DU PONT-TORAY CO., LTD.) was used. Then, the LCP fiber mat on which the release film was laminated was set in the high-temperature pressing device. The set LCP fiber mat was pressed together with the release film and the electrolytic copper foil for 10 seconds at a temperature of 295° C. and a pressing pressure of 6 MPa. Note that, a size of the pressing member used for pressing was 170 mm square. After completion of the heat-pressing, the release film was removed to obtain the FCCL.

Finally, the electrolytic copper foil bonded to the LCP film was removed by etching using an aqueous solution of ferric chloride. As a result, an LCP film was obtained. A thickness of the LCP film was 25 μm.

Example 2

An FCCL and an LCP film were produced in the same production steps as in Example 1, except that a methacrylic silane coupling agent was used as an additive to be added to the dispersion of barium titanate, and an ultrasonic stirrer was used instead of a ball mill for stirring the dispersion of barium titanate.

Example 3

An FCCL and an LCP film were produced in the same production steps as in Example 1, except that barium titanate particles having a D50 (average particle size) of 1.2 μm as measured with a laser diffraction particle size analyzer LA-950V2 (manufactured by HORIBA) were used.

Example 4

An FCCL and an LCP film were produced in the same production steps as in Example 1, except that calcium titanate powder (D50 (average particle size) of 1.5 μm as measured with a laser diffraction particle size distribution meter LA-950V2 (manufactured by HORIBA)) was used instead of barium titanate powder as an inorganic filler raw material.

Example 5

An FCCL and an LCP film were produced by the same production process as in Example 4 except that a paste-like mixture was prepared such that the volume ratio of the LCP powder and the inorganic filler (calcium titanate) was 7:3.

Example 6

An FCCL and an LCP film were produced by the same production process as in Example 1 except that the ethanol slurry in which the finely pulverized LCP was dispersed was repeatedly pulverized 30 times by a wet high-pressure crushing device in the production of the LCP powder. The average value of the fiber diameters (average diameter) measured for 100 LCP fibers contained in the LCP powder was 0.8 μm.

Comparative Example 1

An FCCL and an LCP film were produced by the same production process as in Example 1 except that no additive was added to butanediol in the preparation of the dispersion of barium titanate.

Comparative Example 2

An FCCL and an LCP film were produced by the same production process as in Example 4 except that a paste-like mixture was prepared such that the volume ratio of the LCP powder and the inorganic filler (calcium titanate) was 9:1.

[Measurement of Average Value of Distances Between Barycentric Coordinates of Particles of Inorganic Filler]

For the LCP films of Examples 1 to 5 and Comparative Examples 1 and 2, the average value of the distances between the barycentric coordinates of the inorganic filler particles in the LCP film was measured by the above-described measurement method. The average value of the distances between the barycentric coordinates of the particles of 101 inorganic fillers in Example 1, 134 in Example 2, 72 in Example 3, 91 in Example 4, 105 in Example 5, 142 in Example 6, 89 in Comparative Example 1, and 107 in Comparative Example 2 was determined.

17 18

[Measurement of Linear Expansion Coefficient]

For the LCP films of Examples 1 to 6 and Comparative Examples 1 and 2, the linear expansion coefficient (CTE) in the in-plane direction of the main surface was measured. Specifically, the CTE of the LCP film in the main surface (an XY direction) was measured according to JIS K 7197 by a TMA (thermomechanical analysis) method. As conditions of the TMA, a temperature was raised from room temperature to 150° C. under a nitrogen atmosphere, and then the temperature was cooled to room temperature at 10° C./min using a thermal analyzer (TMA4030SA manufactured by Bruker Corporation), a load was set to 10 g, a sample shape was set to a strip shape (5 mm×10 mm), and a CTE between 80° C. and 40° C. in a cooling process was determined.

[Measurement of Relative Permittivity and Dielectric Loss Tangent]

The relative permittivity (Dk) and dielectric loss tangent (Df) of the LCP films of Examples 1 to 6 and Comparative Examples 1 and 2 were measured. Specifically, for each from the volume ratio at the time of mixing the LCP powder and the inorganic filler (barium titanate) in the process for producing the LCP film.

[Measurement of Warpage Amount]

For the FCCL of Examples 1 to 6 and Comparative Examples 1 and 2, the warpage amount was measured. Specifically, the FCCL having a 150 mm square was left standing in a glass plate shape with a copper foil surface facing down, a distance from the glass plate was measured for the FCCL square, and an average value thereof was taken as the amount of warpage. Note that, the FCCL becomes cylindrical as the warpage increases, and the distance from the glass plate cannot be measured for a square. In a case where a cylinder having a circumference of 150 mm was formed, the distance of the square from the glass plate was a maximum value (about 48 mm), and thus a cylindrical shape was set to ">48 mm".

The evaluation results for the LCP film and the FCCL of each of Examples 1 to 6 and Comparative Examples 1 and 2 are shown in Table 1.

TABLE 1

| | Average diameter of LCP fiber of LCP powder [μm] | Inorganic filler Type | Inorganic filler D50 [μm] | Volume ratio of LCP powder and inorganic filler | Additive | LCP film Average value of distance between barycentric coordinates [μm] | CTE [ppm/° C.] | Dk | Df | FCCL Warpage amount [mm] |
|---|---|---|---|---|---|---|---|---|---|---|
| Example 1 | 1.4 | BaTiO$_3$ | 0.5 | 8:2 | Dispersant | 0.7 | 25 | 9.0 | $6*10^{-2}$ | 10 |
| Example 2 | 1.4 | BaTiO$_3$ | 0.5 | 8:2 | Silane coupling agent | 0.5 | 27 | 9.5 | $6*10^{-2}$ | 13 |
| Example 3 | 1.4 | BaTiO$_3$ | 1.2 | 8:2 | Dispersant | 1.5 | 23 | 8.0 | $5*10^{-2}$ | 6 |
| Example 4 | 1.4 | CaTiO$_3$ | 1.5 | 8:2 | Dispersant | 2.0 | 23 | 7.5 | $5*10^{-3}$ | 5 |
| Example 5 | 1.4 | CaTiO$_3$ | 1.5 | 7:3 | Dispersant | 1.5 | 26 | 10.0 | $8*10^{-3}$ | 10 |
| Example 6 | 0.8 | BaTiO$_3$ | 0.5 | 8:2 | Dispersant | 0.6 | 22 | 9.0 | $6*10^{-2}$ | 8 |
| Comparative Example 1 | 1.4 | BaTiO$_3$ | 0.5 | 8:2 | — | 0.3 | 43 | 11.0 | $7*10^{-2}$ | >48 |
| Comparative Example 2 | 1.4 | CaTiO$_3$ | 1.5 | 9:1 | Dispersant | 2.5 | 22 | 4.5 | $2*10^{-2}$ | 5 | resin film, a test piece (thickness: 50 μm) of 30 mm×30 mm was prepared, and the relative permittivity and the dielectric loss tangent of the test piece were measured by a cavity resonator method using a dielectric constant measurement device in accordance with JIS R 1641. The measurement was performed by applying a high-frequency signal of 12 GHz at an ambient temperature of 25° C.

[Calculation of Filler Volume Filling Rate]

For the LCP films of Examples 1 to 6 and Comparative Examples 1 and 2, the volume filling rate of the inorganic filler in the LCP film was calculated. Specifically, first, a 5 cm square test piece was cut out from the LCP film, and the weight of the test piece was measured with an electronic balance to calculate the density of the LCP film. Then, the density of the LCP film was calculated based on the calculated density of the LCP film and the value of the density of the LCP and each inorganic filler. The values of the density of the LCP and each inorganic filler may be measured in advance by a pycnometer, or may be literature values described in "Chemical Handbook (edited by Japanese Chemical Society, published by Maruzen Inc.) or the like. As a result of the above calculation of the filler volume filling rate, it was confirmed that the volume filling rate of the filler in each Example and each Comparative Example was equivalent to the volume filling rate of the filler calculated As shown in Table 1, it can be seen that in Examples 1 to 6 in which the average value of the distances between the barycentric coordinates of the particles of the inorganic filler in the LCP film is 0.5 μm to 2.0 μm, the linear expansion coefficient (CTE) in the in-plane direction of the main surface of the LCP film is reduced and the warpage amount of the FCCL is reduced as compared with the LCP film according to Comparative Example 1 in which the average value of the distances between the barycentric coordinates is less than 0.5 μm. Furthermore, as shown in Table 1, it can be seen that the relative permittivity (Dk) of Examples 1 to 6 is higher than that of Comparative Example 2 in which the average value of the distances between the barycentric coordinates of the particles of the inorganic filler is more than 2.0 μm.

Figure 6:
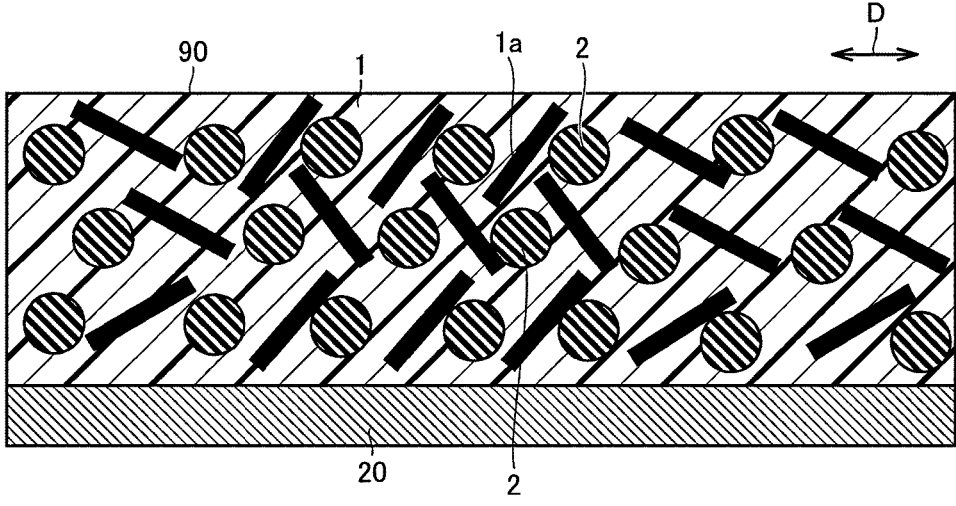
FIG. 6 is a sectional view schematically showing a laminated body according to Comparative Example 1.

FIG. 6 is a sectional view schematically showing the laminated body according to Comparative Example 1. As shown in FIG. 6, in a liquid crystal polymer film 90 according to Comparative Example 1, since the average value of the distances between the barycentric coordinates is less than 0.5 μm, it is considered that the distance between the particles of the inorganic filler 2 cannot be sufficiently secured, and the alignment of the molecular axis 1a of the liquid crystal polymer 1 located between the inorganic fillers 2 along the in-plane direction D of the main surface of the film is inhibited.

As described above, the liquid crystal polymer film according to one embodiment of the present disclosure is a liquid crystal polymer film containing the liquid crystal polymer and the inorganic filler, and has a relative permittivity of 5 to 10, and the average value of the distances between the barycentric coordinates of the particles of the inorganic filler in the liquid crystal polymer film is 0.5 μm to 2.0 μm. According to the above configuration, a distance between the inorganic fillers is secured to some extent in the liquid crystal polymer film.

SUPPLEMENTARY NOTE

As described above, the present embodiment includes the following disclosure.

<1> A liquid crystal polymer film including: a liquid crystal polymer; and an inorganic filler, in which a relative permittivity is 5 to 10, and an average value of distances between barycentric coordinates of particles of the inorganic filler in the liquid crystal polymer film is 0.5 μm to 2.0 μm.

<2> The liquid crystal polymer film according to <1>, in which the inorganic filler is an alkaline earth metal titanate.

<3> The liquid crystal polymer film according to <2>, in which the inorganic filler is barium titanate.

<4> The liquid crystal polymer film according to <2>, in which the inorganic filler is calcium titanate or strontium titanate.

<5> The liquid crystal polymer film according to any one of <1> to <4>, in which a ratio of a content of the inorganic filler to a total content of the liquid crystal polymer and the inorganic filler is 20 vol % to 30 vol %.

<6> The liquid crystal polymer film according to any one of <1> to <5>, in which the inorganic filler has an average particle size of 0.5 μm to 1.5 μm.

<7> A laminated body including: the liquid crystal polymer film according to any one of <1> to <6>; and a conductor layer stacked on the liquid crystal polymer film.

<8> The laminated body according to <7>, in which the conductor layer is a copper foil, and a warpage amount is 10 mm or less.

<9> A method of producing the liquid crystal polymer film according to any one of <1> to <6>, the method including: a dispersion step of dispersing a liquid crystal polymer powder and the inorganic filler in a dispersing medium to obtain a paste-like or slurry-like mixture; a matting step of drying the paste-like or slurry-like mixture to form a mixture mat; and a heat-pressing step of heat-pressing the mixture mat to obtain the liquid crystal polymer film.

<10> The method of producing a liquid crystal polymer film according to <9>, in which the liquid crystal polymer powder includes liquid crystal polymer fibers that are fibrous particles including the liquid crystal polymer, and the liquid crystal polymer fibers have an average diameter of 1.4 μm or less.

In the description of the above embodiment, combinable configurations may be combined with each other.

The embodiments and examples disclosed herein are all to be considered by way of examples in all respects, but not limiting. The scope of claims is not limited by the above description, and intended to encompass all modifications within the spirit and scope equivalent to the claims, as well as any claims of varying scope submitted in further related applications.

DESCRIPTION OF REFERENCE SYMBOLS

1: Liquid crystal polymer
1a: Molecular axis

2: Inorganic filler
10, 90: Liquid crystal polymer film
20: Conductor layer
100: Laminated body

The invention claimed is:

1. A liquid crystal polymer film comprising:
   a liquid crystal polymer; and
   an inorganic filler,
   wherein a relative permittivity of the liquid crystal polymer film is 5 to 10, and an average value of distances between barycentric coordinates of particles of the inorganic filler in the liquid crystal polymer film is 0.5 μm to 2.0 μm.

2. The liquid crystal polymer film according to claim 1, wherein the inorganic filler is an alkaline earth metal titanate.

3. The liquid crystal polymer film according to claim 2, wherein the inorganic filler is barium titanate.

4. The liquid crystal polymer film according to claim 2, wherein the inorganic filler is calcium titanate or strontium titanate.

5. The liquid crystal polymer film according to claim 1, wherein a ratio of a content of the inorganic filler to a total content of the liquid crystal polymer and the inorganic filler is 20 vol % to 30 vol %.

6. The liquid crystal polymer film according to claim 1, wherein the inorganic filler has an average particle size of 0.5 μm to 1.5 μm.

7. The liquid crystal polymer film according to claim 1, wherein the liquid crystal polymer film has a dielectric loss tangent of 0.01 or less.

8. The liquid crystal polymer film according to claim 1, wherein the liquid crystal polymer is a thermotropic liquid crystal polymer.

9. The liquid crystal polymer film according to claim 1, wherein the liquid crystal polymer includes liquid crystal polymer fibers that are fibrous particles.

10. The liquid crystal polymer film according to claim 9, wherein the liquid crystal polymer fibers have an average diameter of 0.07 μm to 2 μm or less.

11. The liquid crystal polymer film according to claim 9, wherein the liquid crystal polymer fibers have an average aspect ratio of 10 to 500.

12. The liquid crystal polymer film according to claim 1, wherein an average inclination of the inorganic filler with respect to an in-plane direction of a main surface of the liquid crystal polymer film is 15° or less.

13. A laminated body comprising:
    the liquid crystal polymer film according to claim 1; and
    a conductor layer on the liquid crystal polymer film.

14. The laminated body according to claim 13, wherein the conductor layer is a copper foil having a warpage amount of 10 mm or less.

15. A method of producing a liquid crystal polymer film, the method comprising:
    dispersing a liquid crystal polymer powder and an inorganic filler in a dispersing medium to obtain a mixture;
    drying the mixture to form a mixture mat; and
    heat-pressing the mixture mat to obtain the liquid crystal polymer film having a relative permittivity of 5 to 10, and wherein an average value of distances between barycentric coordinates of particles of the inorganic filler in the liquid crystal polymer film is 0.5 μm to 2.0 μm.

16. The method of producing a liquid crystal polymer film according to claim 15, wherein the liquid crystal polymer powder includes liquid crystal polymer fibers that are fibrous particles, and the liquid crystal polymer fibers have an average diameter of 1.4 μm or less.

17. The method of producing a liquid crystal polymer film according to claim 15, wherein the inorganic filler is an alkaline earth metal titanate.

18. The method of producing a liquid crystal polymer film according to claim 17, wherein the inorganic filler is barium titanate.

19. The method of producing a liquid crystal polymer film according to claim 17, wherein the inorganic filler is calcium titanate or strontium titanate.

20. The method of producing a liquid crystal polymer film according to claim 15, wherein a ratio of a content of the inorganic filler to a total content of the liquid crystal polymer powder and the inorganic filler is 20 vol % to 30 vol %.

\* \* \* \* \*